(12) United States Patent
Etelapera

(10) Patent No.: US 8,108,832 B2
(45) Date of Patent: *Jan. 31, 2012

(54) MULTIPLE DEVICE NOTIFICATION SYNCHRONIZATION

(75) Inventor: Esa Etelapera, Tampere (FI)

(73) Assignee: Nokia Corporation, Espoo (FI)

( * ) Notice: Subject to any disclaimer, the term of this patent is extended or adjusted under 35 U.S.C. 154(b) by 726 days.

This patent is subject to a terminal disclaimer.

(21) Appl. No.: 12/221,336

(22) Filed: Aug. 1, 2008

(65) Prior Publication Data

US 2008/0301249 A1    Dec. 4, 2008

Related U.S. Application Data

(62) Division of application No. 11/029,937, filed on Jan. 4, 2005, now Pat. No. 7,475,395.

(51) Int. Cl.
*G06F 9/44* (2006.01)

(52) U.S. Cl. ......... 717/108; 717/107; 717/109; 717/121
(58) Field of Classification Search .................. None
See application file for complete search history.

(56) References Cited

U.S. PATENT DOCUMENTS

| 5,519,866 | A | 5/1996 | Lawrence et al. | 395/700 |
| 7,475,395 | B2 * | 1/2009 | Etelapera | 717/172 |
| 2004/0142711 | A1 | 7/2004 | Mahonen et al. | 455/502 |

* cited by examiner

*Primary Examiner* — Chuck Kendall
(74) *Attorney, Agent, or Firm* — Harrington & Smith

(57) ABSTRACT

A system for updating multiple copies of a software program on respective multiple devices includes a system for responding to a notification of a first copy of the software program in a first one of the devices; a system for sending a notification responded signal to a second one of the devices by the first device that the notification has been responded to; and a system for automatically preventing a duplicate of the notification from occurring in a second copy of the software program on the second device based upon the notification responded signal received by the second device from the first device.

27 Claims, 3 Drawing Sheets

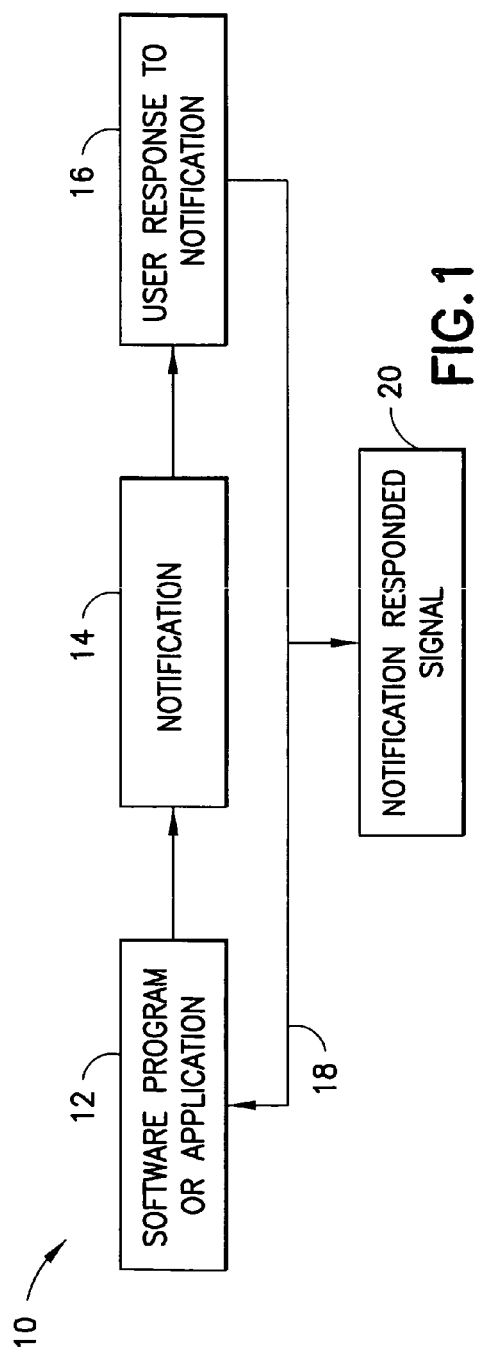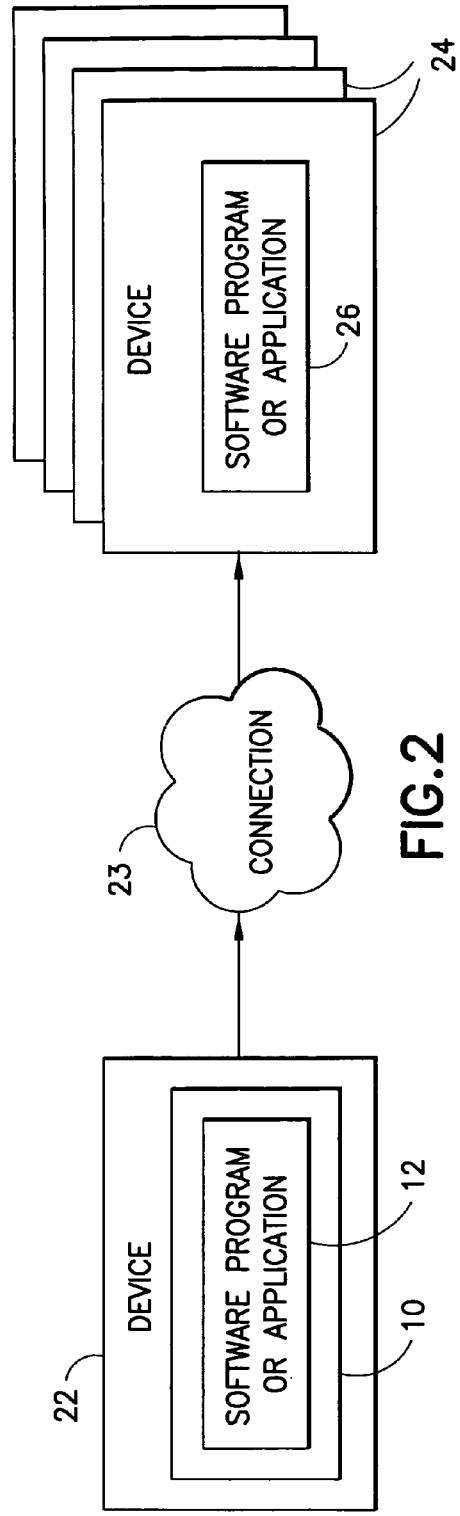

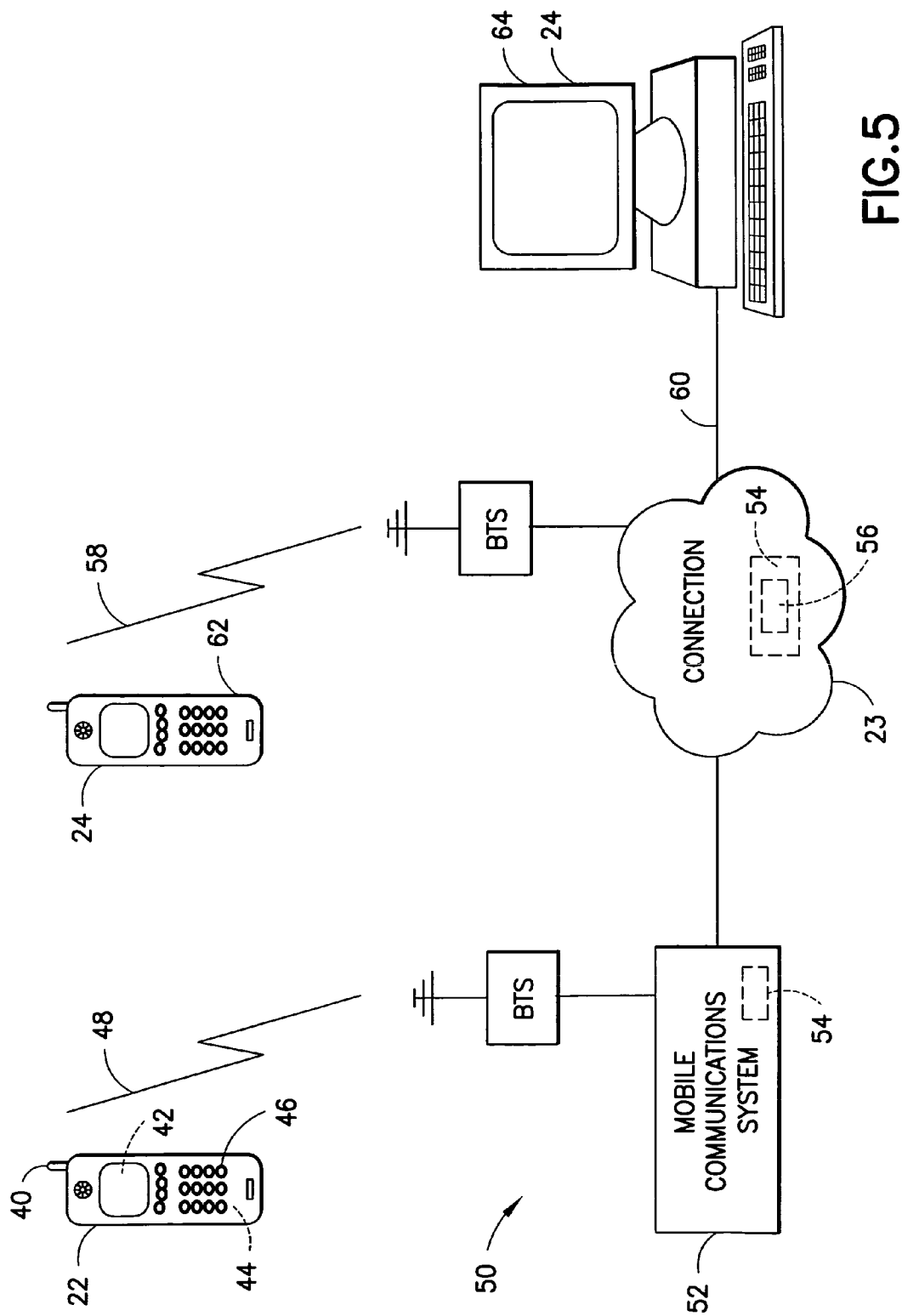

MULTIPLE DEVICE NOTIFICATION SYNCHRONIZATION

CROSS REFERENCE TO RELATED APPLICATION

This is a divisional patent application of U.S. patent application Ser. No. 11/029,937 filed Jan. 4, 2005 now U.S. Pat. No. 7,475,395.

BACKGROUND OF THE INVENTION

1. Field of the Invention

The present invention relates to responding to notifications and, more particularly, to prevent or respond to duplicate notifications in a software program or application on respective multiple devices.

2. Brief Description of Prior Developments

If a user has calendars in multiple devices synchronized, such as two mobile devices and a personal computer (PC), a calendar alarm can pop-up in all devices at the same time. Responding to all three alarm notifications in each device separately is annoying and time consuming. No earlier solutions, other than manual dismissal of notifications on each device, are known.

There is a desire to provide a system which can update software programs or applications on respective multiple devices when a response to a notification is entered by a user in one of the devices, thus, eliminating the need to manually dismiss the notifications on each of the other devices.

SUMMARY OF THE INVENTION

In accordance with one aspect of the present invention, a system for updating multiple copies of a software program on respective multiple devices is provided including a system for responding to a notification of a first copy of the software program in a first one of the devices; a system for sending a notification responded signal to a second one of the devices by the first device that the notification has been responded to; and a system for automatically preventing a duplicate of the notification from occurring in a second copy of the software program on the second device based upon the notification responded signal received by the second device from the first device.

In accordance with another aspect of the present invention, a system for updating multiple copies of a software program on respective multiple devices is provided comprising a system for responding to a notification of a first copy of the software program in a first one of the devices; a system for sending a notification responded signal to a second one of the devices by the first device that the notification has been responded to; and a system for automatically responding to a duplicate of the notification in a second copy of the software program on the second device based upon the notification responded signal received by the second device from the first device.

In accordance with one method of the present invention, a method of updating multiple copies of a software program on respective multiple devices is provided comprising responding to a notification of a first copy of the software program in a first one of the devices; sending a notification responded signal to a second one of the devices by the first device that the notification has been responded to; and automatically preventing a duplicate of the notification from occurring in a second copy of the software program on the second device based upon the notification responded signal received by the second device from the first device.

In accordance with another method of the present invention, a method of updating multiple copies of a software program on respective multiple devices is provided comprising responding to a notification of a first copy of the software program in a first one of the devices; sending a notification responded signal to a second one of the devices by the first device that the notification has been responded to; and automatically responding to a duplicate of the notification in a second copy of the software program on the second device based upon the notification responded signal received by the second device from the first device.

BRIEF DESCRIPTION OF THE DRAWINGS

The foregoing aspects and other features of the present invention are explained in the following description, taken in connection with the accompanying drawings, wherein:

FIG. 1 is a block diagram of components and steps in a device incorporating features of the present invention;

FIG. 2 is a block diagram illustrating coupling of the device shown in FIG. 1 to one or more second devices;

FIG. 5 is a diagram of a system using features of the present invention with multiple mobile communications devices.

DETAILED DESCRIPTION OF THE PREFERRED EMBODIMENTS

Figure 3:
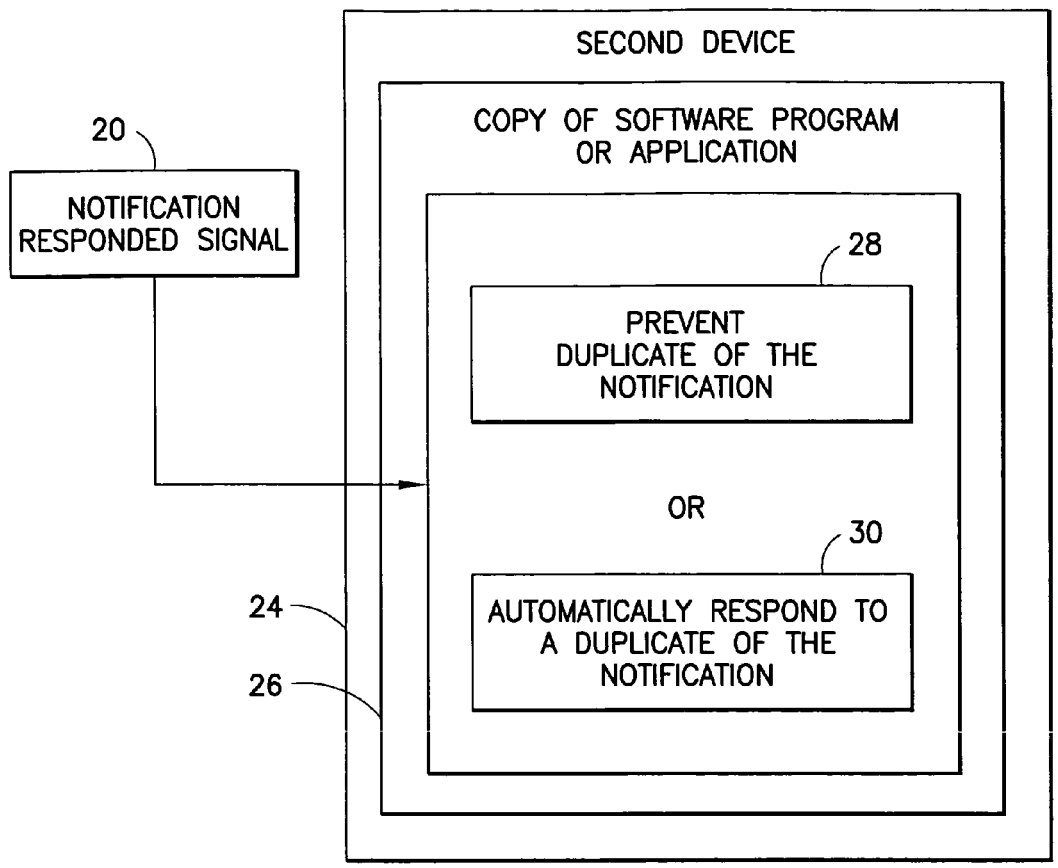
FIG. 3 is a block diagram of components and steps used in one of the second devices shown in FIG. 2.

Referring to FIG. 1, there is shown a block diagram of a system 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

This invention relates to multiple device ownership or use by a same user, and corresponding user interface notifications happening in several devices. This invention enables the user to respond to an alarm notification only on one device, which then communicates the response to the other devices. This system can, in turn, automatically close the corresponding alarm notifications in the other devices with the given response, or cancel showing the corresponding notifications if they haven't shown yet. This invention can be generalized so that any notification or user interaction associated to a same event, and happening on multiple devices, can be responded to by using only one device. This invention requires that the devices are somehow connected to each other. The connection media may be, for example, Bluetooth, USB, TCP/IP, Infrared, etc. The connection may be active at the time of alarm or notification happening, or can occur later after it has happened. The alarm or notification is associated with a unique event identifier which is common between all related devices. All devices can implement the same protocol which at least describe the event identifier and response identifier.

The present invention relates to synchronization in a multi-device environment. In the future a person may have more than one mobile devices in use (one in work, one in free time, etc.) that all should be synchronized with each other and with a separate device such as a personal computer (PC). There is a need that a user should be able to respond to (e.g. calendar alert) via one device without a need to acknowledge the same event notification from each device.

FIG. 1 shows a software program or application 12 which is adapted to send a notification or alarm 14 to the user. For example, the program 12 could comprise a calendar or scheduling program, such as Microsoft® Outlook®, MEETING MAKER, OfficeTalk®, PDA or Palm® software, or even a web based system such as MyAppointments.net. The notification could be a task reminder or calendar event, or any other suitable type of alarm or notification. When the notification 14 takes place, the user of the device can respond to the notification as indicated in block 16. This response then deactivates the notification or resets the notification for a future time and/or date. When the user responds to the notification, the program 12 receives a signal as indicated by line 18 and, in addition, the device generates a notification responded signal 20. The notification responded signal 20 could be generated by the program 12 or any other suitable system inside the device. The notification responded signal 20 is adapted to be sent from the device to at least one other device.

Referring also to FIG. 2, the system 10 is shown inside a first device 22. The first device 22 can send the notification responded signal 20 to one or more second devices 24 by a connection 23. The connection 23 could comprise any suitable type of connection including, for example, Bluetooth, USB, TCP/IP, Infrared, Internet, Intranet, or use of a mobile telephone communications system. The receiving device(s) 24 comprises a copy of the software program or application 12. The copy 26 could be a same version of the original software program or application 12 or could be a different version, so long as the original 12 and the copy 26 use compatible notification or alarm systems. The program/application 26 could comprise a calendar or scheduling program, such as for example Microsoft® Outlook®, MEETING MAKER, OfficeTalk®, PDA or Palm® software, or even a web based system such as MyAppointments.net. The original 12 and the copy or receiving program/application 26 could be different programs/applications, so long as they use compatible notification or alarm systems. The programs/applications could be adapted to run on different operating systems; such as WINDOWS, WINDOWS CE, LINUX, PSION EPOC, and PALM OS for example.

Referring also to FIG. 3, when the notification responded signal 20 is received by the second device(s) 24, the signal 20 is sent to the program or application 26. The program or application 26 uses the signal to either prevent a duplicate of the notification 14 from occurring in the second device(s) 24 as indicated by block 28, or automatically responds to the duplicate of the notification as indicated by block 30 if the notification has already occurred in the second device 24. The software/application 26 or another component of the device 24 could be adapted to perform one or both of these operations 28, 30.

Figure 4:
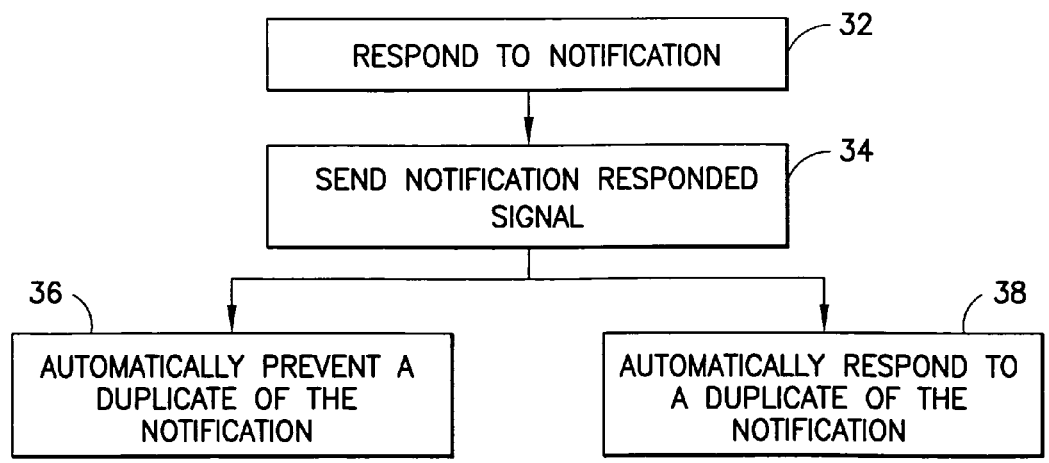
FIG. 4 is a block diagram of method steps used with features of the present invention.

With the present invention, when a user responses to the notification 14 (e.g. calendar alarm) in a first device 22, the device 22 can send the response to the other devices 24 using an agreed protocol and an active connection media; the connection 23. The device(s) 24 receiving the response can find a notification having the same identifier as in the response, and feeds the response to the similar application (or piece of software) in the receiving device 24; the similar program/application to that which initiated the notification in the sending device 22. The application in this other device then uses the response as it was given by the user in the first device. This is illustrated in FIG. 4. The user responds to the notification in the first device as indicated by block 32. The first device sends the notification responded signal as indicated by block 34. The notification responded signal can then be used by the receiving device to either automatically prevent a duplicate or equivalent of the notification in the receiving device as indicated by block 36, or automatically respond to a duplicate or equivalent of the notification by the receiving device as indicated in block 38.

It is possible to synchronize locally between a mobile device such as a mobile telephone and a PC, and remotely between the mobile terminal and a network server. U.S. patent application Ser. No. 10/661,779 filed Sep. 11, 2003, which is hereby incorporated by reference in its entirety, teaches how two terminals can be synchronized by using special profiles for activation. This does not teach acknowledging notifications, but generally about synchronization. The present invention provides a feature which enables a person to respond concentradetly to application notifications occurring in several devices in a same time.

Referring now also to FIG. 5, one scenario of use of the present invention with a mobile communications device will be described. In this scenario the first device 22 comprises a mobile telephone or communicator. The device 22 could comprise any type of mobile electronic apparatus such as, for example, a mobile telephone, a personal data assistant (PDA), a mobile communicator, a laptop or notebook computer, or a mobile game player. In the embodiment shown, the mobile device 22 comprises an antenna 40, a transceiver 42, a controller 44, and a user interface 46. The mobile device 22 obviously comprises other components. For example, in a mobile telephone or mobile communicator the mobile device 22 comprises a display screen, a battery, a microphone and a speaker or sound transducer. The present invention could also be used with mobile devices that are not in just one piece. The mobile device could be ubiquitous in a sense that storage memory is outside the core device and perhaps has some other components as well. The present invention could be used with a virtual device with all the components existing, but not all in the same "place".

The transceiver 42 and antenna 40 are adapted to communicate by means of a link 48 through a mobile communications system 50 as part of the connection 23. In the embodiment shown, the link 48 comprises a wireless link, such as a radio frequency link. The air interface standard may conform to, for example, a Time Division Multiple Access (TDMA) air interface, or a Code Division Multiple Access (CDMA) air interface, or a Frequency Division Multiple Access (FDMA) air interface, or GSM, or 3G. In alternate embodiments, features of the present invention could be used with any suitable type of air interface standard. In an alternate embodiment, features of the present invention could be used with a wired communications system, such as a land line telephone system. The wireless telecommunications system establishes the wireless link 48 to couple the mobile device 22 to a base transceiver station (BTS) of the exemplary network operator 52.

The network operator generally comprises a mobile switching center (MSC) for connecting to a telecommunications network, such as a public switched telephone network or PSTN, at least one base station controller (BSC), and a plurality of base transceiver stations (BTS) that transmit in a forward or downlink direction both physical and logical channels to the mobile device 16 in accordance with a predetermined air interface standard. A reverse or uplink communication path exists from the mobile device 22 to the network operator, and conveys mobile station originated access requests and traffic, such as voice and possible packet data traffic.

The network operator can include a Message Service Center (MSCT) that receives and forwards messages from the mobile device 22, such as Short Message Service (SAS) messages, or any wireless messaging technique including Email and supplementary data services. In an alternate embodiment, features of the present invention could be used with any suitable type of network operator system.

The mobile device 22 also contains a wireless section that includes a digital signal processor (DSP), or equivalent high-speed processor, as well as the wireless radio frequency (RF) transceiver 42 comprising a transmitter and a receiver. The transceiver is coupled to the antenna 40 for communication with the network operator. In an alternate embodiment, features of the present invention could be used with any suitable type of wireless communications device or mobile phone. Data transfer can occur between the mobile device 22 and the one of the other devices 24 by means of the mobile communications system 50 and connection 23.

The connection 23 could comprise a server 54 with a memory 56. The server 54 can be used to temporarily store the notification responded signal 20 in the event any of the links 58, 60 of the connection 23 to the other devices 24 is not active. When the links 58, 60 become active, the server 54 can then forward or send the signal 20 to the device(s) 24. In an alternate embodiment, the mobile communications system 50 could comprise the server 54 used for temporarily storing the notification responded signal 20. The system for sending the notification responded signal is preferably adapted to send the notification responded signal to the plurality of second devices at substantially a same time.

As noted above, the server 54 could be located in the mobile communications system 50 or the connection 23. The connection 23 could comprise any suitable type of connection such as, for example, a telephone line, a cable line, satellite dish, an Internet connection, a wireless link, etc. or a combination or two or more of these. In the embodiment shown, one of the second devices 24 is a second mobile telephone or communicator 62. The link 58 comprises a wireless link. The other one of the second devices 24 is a personal computer 64. The link 60 comprises a connection such as a DSL connection or a cable modem connection.

With this embodiment the two second devices 62, 64 comprise a program or application with a notification feature similar to the notification feature in the mobile telephone 22. When the user responds to the notification in the mobile telephone 22, the mobile telephone 22 is able to send the notification responded signal to the other devices 62, 64 via the connection 23 and links 58, 60. Thus, the present invention can prevent a duplicate or similar notification from occurring in the devices 62, 64 or, if they have already occurred before the notification responded signal is received by the devices 62, 64, then allow the devices 62, 64 to automatically respond to those notification(s) in the devices 62, 64 when the notification responded signal is received.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A device comprising:
   a system for presenting a user with a notification from a first software program or application;
   an entering system for allowing the user to enter a response to the notification in the device;
   a system for sending a notification responded signal from the device for reception by a second device, wherein the notification responded signal is generated based upon entry of the response by the user into the entering system, wherein the notification responded signal comprises an indication that the notification has been responded to by the user,
   wherein the notification responded signal comprises a unique event identifier which is configured to be used by a separate second software program or application in the second device to prevent a duplicate of the notification in the second device or to automatically respond to a duplicate of the notification in the second device.

2. A device as in claim 1 wherein the first software program or application is on an apparatus different from the device.

3. A device as in claim 1 wherein the device comprises the first software program or application.

4. A device as in claim 3 wherein first software program or application comprises a calendar event scheduler.

5. A device as in claim 1 wherein the notification comprises a time calendared event.

6. A device as in claim 1 wherein the system for sending the notification responded signal from the device comprises an antenna and a transceiver.

7. A device as in claim 1 wherein the system for sending the notification responded signal from the device comprises the first software program or application.

8. A device as in claim 1 wherein the unique event identifier comprises an event date and time indication.

9. A device as in claim 1 wherein the system for sending the notification responded signal from the device is configured to automatically send the notification responded signal to the second device by a wireless link.

10. A device as in claim 9 wherein the system for sending the notification responded signal from the device is configured to send the notification responded signal to a plurality of devices specified by the user.

11. A device comprising:
    a notification system configured to generate a notification to a user regarding an event having a unique event identifier; and
    a system for receiving a notification responded signal from another device, wherein the notification responded signal comprises the unique event identifier and an indication that a duplicate of the notification has been responded to, wherein the notification system is configured to use the notification responded signal to prevent the notification from occurring in the device or to automatically respond to the notification in the device based upon receipt of the notification responded signal by the device.

12. A device as in claim 11 wherein the notification system comprises a calendared event scheduler.

13. A device as in claim 11 wherein the unique event identifier comprises an event date and time indication.

14. A device as in claim 11 wherein the system for receiving the notification responded signal from another device comprises an antenna and a transceiver.

15. A device as in claim 11 wherein the notification system is configured to receive a message from another apparatus to thereby trigger generation of the notification in the device to the user.

16. A method comprising:
    generating a notification responded signal by a first device, wherein the notification responded signal is based upon a user response signal from a user input responding to a notification from a first software program or application; and transmitting the notification responded signal from the first device for use by a second device, wherein the notification responded signal comprises a unique event identifier corresponding to the notification, and wherein the notification responded signal is configured to be used by a second software program or application in the second device to prevent a duplicate of the notification in the second device or to automatically respond to a duplicate of the notification in the second device.

17. A method as in claim 16 wherein transmitting the notification responded signal is automatic by a wireless link from the first device.

18. A method as in claim 16 wherein generating the notification responded signal by the first device comprises providing in the notification responded signal an indication that the notification has been responded to by the user.

19. A method as in claim 16 wherein generating the notification responded signal by the first device comprises the first software program or application comprising a calendared event software program or application which issues the notification to the user based upon date and/or time.

20. A method as in claim 16 wherein transmitting the notification responded signal comprises transmitting the notification responded signal to at least two other devices including the second device, wherein the at least two other devices have been specified by the user.

21. A method as in claim 16 further comprising receiving a message from another apparatus to thereby trigger generation of the notification to the user in the device.

22. A method comprising:
receiving a notification responded signal by a second device from a first device, wherein the notification responded signal comprises a unique event identifier and an indication that a duplicate of the notification has been responded to in the first device;
either preventing the notification from occurring in the second device or automatically responding to the notification in the second device based upon receipt of the notification responded signal by the second device.

23. A method as in claim 22 wherein the second device comprises a software program or application configured to generate the notification in the second device, and the step of preventing or automatically responding updates the software program or application in the second device.

24. A program storage device readable by a machine, tangibly embodying a program of instructions executable by the machine for performing operations, the operations comprising:
generating a notification responded signal by a first device based upon a user response signal from a user input responding to a notification from a first software program or application; and
transmitting the notification responded signal from the first device for use by a second device, wherein the notification responded signal comprises a unique event identifier corresponding to the notification and configured to be used by a second software program or application in the second device to prevent a duplicate of the notification in the second device or to automatically respond to a duplicate of the notification in the second device.

25. A program storage device as in claim 24 wherein transmitting the notification responded signal is automatic by a wireless link from the first device.

26. A program storage device readable by a machine, tangibly embodying a program of instructions executable by the machine for performing operations, the operations comprising:
receiving a notification responded signal by a second device from a first device, wherein the notification responded signal comprises a unique event identifier and an indication that a duplicate of the notification has been responded to in the first device;
either preventing the notification from occurring in the second device or automatically responding to the notification in the second device based upon receipt of the notification responded signal by the second device.

27. A program storage device as in claim 26 wherein the second device comprises a software program or application configured to generate the notification in the second device, and the step of preventing or automatically responding updates the software program or application in the second device.

* * * * *